(12) United States Patent
Park

(10) Patent No.: US 7,036,862 B2
(45) Date of Patent: May 2, 2006

(54) OPENING/CLOSING STRUCTURE FOR VEHICULAR TRAY

(75) Inventor: In-heum Park, Suwon-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 11/108,653

(22) Filed: Apr. 19, 2005

(65) Prior Publication Data

US 2005/0275235 A1    Dec. 15, 2005

(30) Foreign Application Priority Data

Jun. 11, 2004    (KR) .................. 10-2004-0043182

(51) Int. Cl.
  *B60N 3/12* (2006.01)
(52) U.S. Cl. .................. 296/37.8; 296/37.12
(58) Field of Classification Search .............. 296/37.8, 296/37.12, 37.13
  See application file for complete search history.

(56) References Cited

U.S. PATENT DOCUMENTS

| | | | |
|---|---|---|---|
| 5,887,930 A * | 3/1999 | Klein ...................... | 296/37.12 |
| 5,951,083 A * | 9/1999 | Bittinger et al. ......... | 296/37.12 |
| 6,131,242 A * | 10/2000 | Zipperle et al. .......... | 296/37.8 |
| 6,601,897 B1 * | 8/2003 | Stelandre et al. ........ | 296/37.12 |
| 2005/0082863 A1 | 4/2005 | Park | |
| 2005/0133553 A1 | 6/2005 | Kim | |

FOREIGN PATENT DOCUMENTS

| | | | | |
|---|---|---|---|---|
| JP | 404090940 A * | 3/1992 | .............. | 296/37.12 |
| KR | 10-2002 0031923 | 5/2002 | | |
| KR | 10-2002 0052905 | 7/2002 | | |

OTHER PUBLICATIONS

English Language Abstract of KR 10-2002-0052905.
English Language Abstract of KR 10-2002-0031923.

* cited by examiner

*Primary Examiner*—Jason Morrow
(74) *Attorney, Agent, or Firm*—Greenblum & Bernstein, P.L.C.

(57) ABSTRACT

An opening/closing structure for a vehicular tray includes a housing opened at a front surface, and internally defining a receiving space, the housing being mounted at a predetermined position of a vehicle body, and having a pair of through-holes formed at both lateral sides of the open front surface, a door covering the open front surface of the housing, a pair of sliding units mounted at both lateral outer surfaces of the housing, the sliding units being horizontally movable through gear engagement, and a pair of connecting members, a first end of each of the connecting members being coupled to the door, a second end of the connecting member passing through one of the through-holes and being fixed to an associated one of the sliding unit.

10 Claims, 2 Drawing Sheets

OPENING/CLOSING STRUCTURE FOR VEHICULAR TRAY

RELATED APPLICATIONS

The present disclosure relates to subject matter contained in Korean Application No. 10 2004-43182, filed on Jun. 11, 2004, which is herein expressly incorporated by reference its entirety.

BACKGROUND OF THE INVENTION

1. Field of the Invention

The present invention relates to an opening/closing structure for a vehicular tray in which sliding units are mounted to both lateral outer surfaces of a housing internally defining a receiving space so that they are horizontally movable through gear engagement, the sliding units being connected to a door by means of connecting members, securing smooth opening or closing operation of the tray.

2. Description of the Related Art

Generally, in most automotive vehicles, trays for the convenience of a driver or passenger are fitted in the lower portion of their instrument panels, and the like. Such a vehicular tray provides a receiving space inside a passenger compartment of the automotive vehicle, allowing the driver or passenger to conveniently store small articles, such as, for example, spectacles or other personal things. The fitting position of the tray is appropriately selected to maximize the convenience of use.

Considering the general configuration of the vehicular tray, it comprises: a housing internally defining a receiving space having a prescribed volume, the housing being opened at one surface thereof; a cover used to open or close the open surface of the housing; and a locker for the opening or closing of the cover.

Referring to FIG. 1, which is a perspective view illustrating the interior structure of a conventional vehicular tray, in relation with the opening or closing of the tray, the tray comprises a housing 11 internally defining a receiving space, in which a case (not shown) is detachably inserted through the open surface of the housing 11.

The not-shown case is coupled with moving means so that as to be horizontally movable inside the housing 11. The moving means is comprised of a rotating shaft 15 provided at both ends thereof with a pair of gears 14, and dampers 16 engaged with the gears 14 and used to control a movement speed of the rotating shaft 15.

In this case, the gears 14 are rotatable and movable in an engaged state with corresponding toothed rows 13, which are horizontally formed throughout both lateral inner surfaces of the housing 11.

With such a conventional configuration, however, since the toothed rows 13 must be formed at the lateral inner surfaces of the housing 11 and the toothed row 13 of the housing 11 are engaged with the gears 14 of the rotating shaft 15, it is very difficult to form a mold of the housing 11, and to perform the overall manufacturing process thereof, resulting in deterioration of productivity thereof.

Further, the fact that the moving means is located and operated inside the housing 11 makes it impossible for the driver or passenger to see the moving means, resulting in difficulties in tuning operations as well as repair thereof in case of damage or failure of parts.

Meanwhile, although there has been used a product wherein a housing thereof having an open front surface is fitted in a vehicle body, and a door for opening or closing the open front surface is hinged to the housing, such a product makes it difficult to utilize the dampers, resulting in deterioration in reliability of products.

SUMMARY OF THE INVENTION

Therefore, the present invention has been made in view of the above problems, and it is an object of the present invention to provide an opening/closing structure for a vehicular tray in which a door for opening or closing an open front surface of the tray is coupled with sliding units mounted to both lateral outer surfaces of a tray housing, the sliding units being horizontally movable through gear engagement, resulting in improved reliability of products and securing compatibility with other products.

In accordance with the present invention, the above and other objects can be accomplished by the provision of an opening/closing structure for a vehicular tray comprising: a housing opened at a front surface, and internally defining a receiving space, the housing being mounted at a predetermined position of a vehicle body, and having a pair of through-holes formed at both lateral sides of the open front surface; a door covering the open front surface of the housing; a pair of sliding units mounted at both lateral outer surfaces of the housing, the sliding units being horizontally movable through gear engagement; and a pair of connecting members, a first end of each of the connecting members being coupled to the door, a second end of the connecting member passing through one of the through-holes and being fixed to an associated one of the sliding unit.

With the opening/closing structure of the vehicular tray as stated above, the sliding units are mounted to both the lateral outer surfaces of the housing in a separable manner through gear engagement, and thus such sliding units are easily applicable to various shapes of trays.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment of the present invention will be explained with reference to the accompanying drawings.

Figure 1:
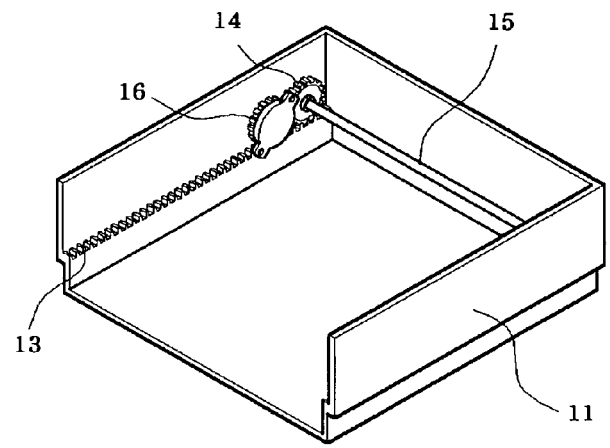
FIG. 1 is a perspective view illustrating the interior structure of a conventional vehicular tray, in relation with the opening or closing of the tray.
Figure 2:
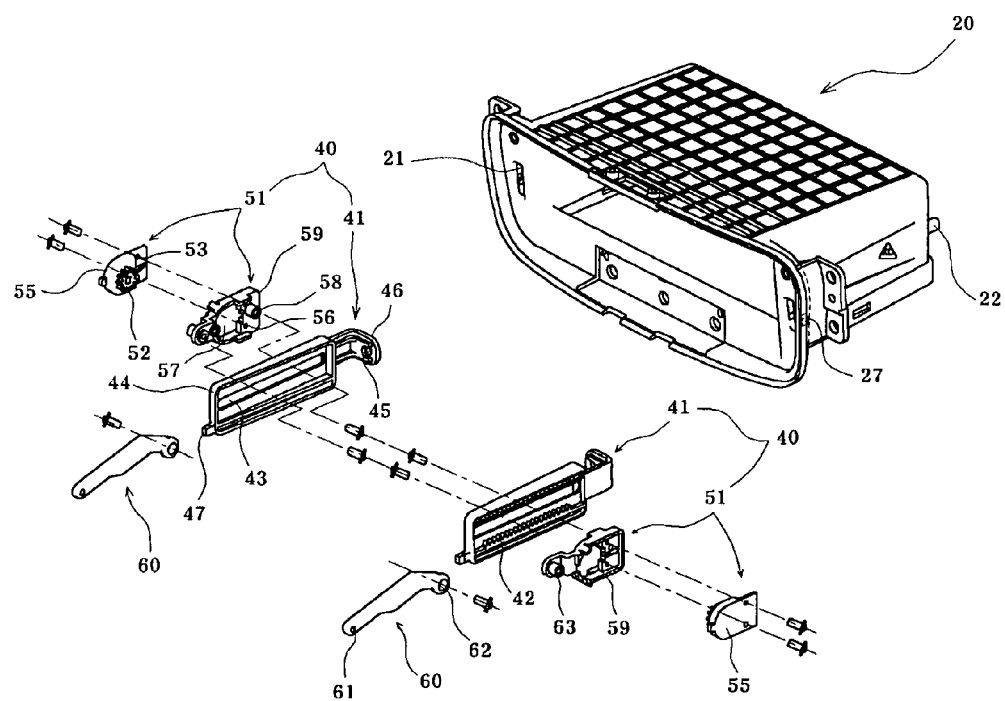
FIG. 2 is an exploded perspective view illustrating sliding units and a housing of the tray in accordance with the present invention.
Figure 3:
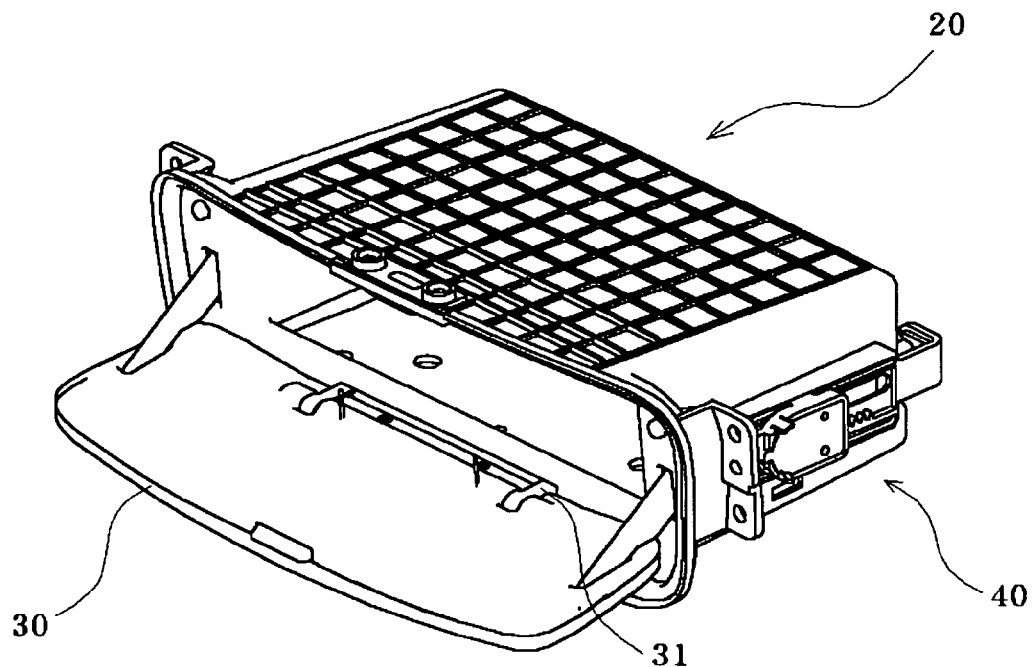
FIG. 3 is a perspective view illustrating an opened state of the tray in accordance with the present invention.
Figure 4:
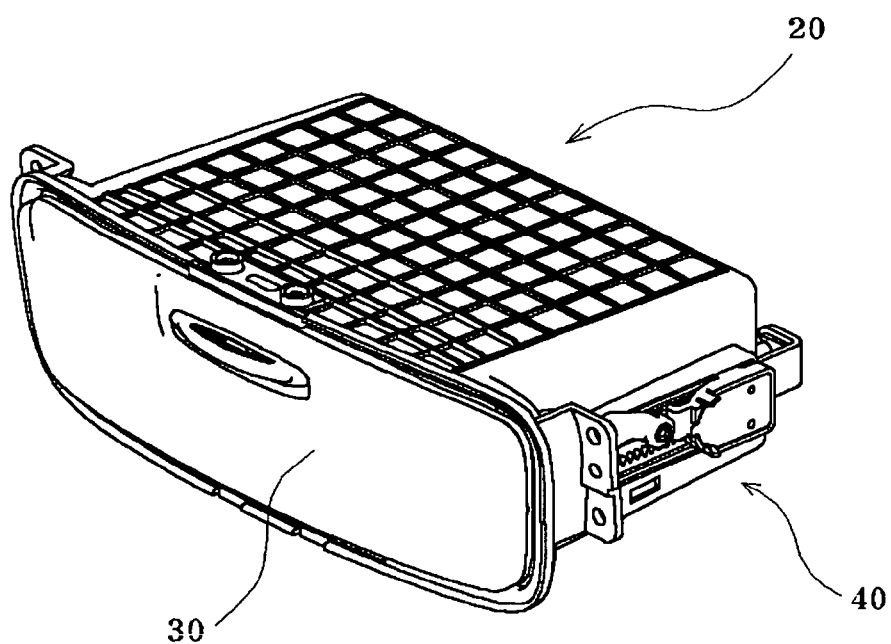
FIG. 4 is a perspective view illustrating a closed state of the tray in accordance with the present invention.

FIG. 2 is an exploded perspective view illustrating sliding units and a housing of the tray in accordance with the present invention. FIGS. 3 and 4 are perspective views, respectively, illustrating opened and closed states of the tray shown in FIG. 2.

As shown in the above drawings, the tray of the present invention comprises a housing 20 opened at a front surface thereof and internally defining a receiving space. The housing 20 is fitted in an appropriate position of a vehicle body, and has a pair of through-holes 21 formed at both lateral sides of the open front surface thereof.

The tray further comprises a door 30 having a size suitable to cover the open front surface of the housing 20. In order to open or close the open front surface of the housing 20, the door 30 is coupled to one edge of the open front surface of the housing 20 by means of a hinge 31. Alternatively, the door 30 is integrally formed with a case to be inserted into the housing 20.

In the former case wherein the door 30 is coupled to the housing 20 by means of the hinge 31, the tray is simply opened or closed through pivotal rotation of the door 30. In the latter case wherein the door 30 is integrally formed with the case inserted in the housing 20, the tray is opened as the door 30 and the case protrude forward under operation of springs.

The tray further comprises a pair of sliding units 40 mounted at both lateral outer surfaces of the housing 20 so as to be horizontally movable through gear engagement, and a pair of connecting members 60, which are coupled at one-side ends thereof to the door 30 and are fixed at the other ends to the sliding units 40 by passing through the through-holes 21, respectively.

Each of the sliding units 40 comprises: a guide rail member 41, which is fixed to one of both the lateral outer surfaces of the housing 20, and has a horizontal toothed row 42 having a prescribed length; and a damper member 51 having a circular gear 52 adapted to horizontally move along the toothed row 42 while being engaged therewith.

Explaining the sliding unit 40 in more detail, the guide rail member 41 has a body 44, which is formed with the toothed row 42 horizontally disposed near a lower end of the lateral outer surface, and a guide slot 43 horizontally perforated above the toothed row 42.

To be easily coupled to the guide rail member 41, the damper member 51 is comprised of a damper portion 55, and a holder portion 59. The damper portion 55 comprises the circular gear 52 rotatably coupled thereto, and one or more damper holes 53.

The holder portion 59 is formed at one side thereof with one or more holder holes 56 corresponding to the damper holes 53 for the coupling of the damper portion 55 and the holder portion 59, and at the other side thereof with a threaded fastening protrusion 58 configured to be inserted and fastened in the guide slot 43. Centrally provided at the holder portion 59 is an opening 57 for allowing the circular gear 52 of the damper portion 55 to be engaged therein.

For assembling the damper member 51, first, the damper holes 53 of the damper portion 55 are coincided with the holder holes 56 of the holder portion 59, and then screws are fastened through the coincided holes 53 and 56. Thereby, the circular gear 52 of the damper portion 55 penetrates through the opening 57 of the holder portion 59.

Then, for allowing the screwed damper member 51 and the guide rail member 41 to move in a fastened state therewith, after the circular gear 52 is engaged with the toothed row 42 so that the threaded fastening protrusion 58 penetrates through the guide slot 43, a screw is fastened into the threaded fastening protrusion 58. In this case, the used screw is configured so that the head thereof has a diameter larger than the width of the guide slot 43 for preventing the damper member 51 from being separated from the guide rail member 41.

Meanwhile, in order to allow the guide rail member 41 to be easily mounted to the lateral outer surface of the housing 20, it is preferable that the body 44 of the guide rail member 41 is formed at one side thereof with an outwardly-extending fitting 47, and at a corresponding outer position of the housing 20 is defined a recess 27 for use in the insertion of the fitting 47.

In addition to the fitting 47 of the guide rail member 41, preferably, at a rear surface of the housing 20 are formed a pair of rearward extending fixtures 22, and at the other side of the body 44 is formed a fixing plate 46. The fixing plate 46 is curved to come into close contact with the rear surface of the housing 20, and has a hole 45 for use in the insertion of the fixture 22.

In this case, preferably, the fitting 47 and the fixing plate 46 are integrally formed with the body 44 in the molding of the guide rail member 41.

Further, in order to allow the sliding unit 40 to be easily coupled to the door 30, the holder portion 59 is formed at one lateral surface thereof with a connector protrusion 63. One end of the connecting member 60 is formed with a pin hole 61 for use in the coupling of the door 30 using a pin, and the other end of the connecting member 60 is formed with a bore 62 for receiving the connector protrusion 63 of the holder portion 59.

Here, the pin coupling structure of the door 30 is achieved in such a fashion that a part of the connecting member 60 formed with the pin hole 61 is inserted into a recess formed in the door 30, and a pin is inserted through the pin hole 61 inside the door 30. Details related to such a pin coupling structure are omitted in the drawings.

Now, the operation and effects of the opening/closing structure for a vehicular tray in accordance with the present invention will be explained.

The damper member 51, which was prepared as the holder portion 59 and the damper portion 55 are integrally coupled to each other, is coupled to the guide rail member 41 to form a modular sliding unit 40. Then, the obtained sliding unit 40 is coupled to the lateral outer surface of the housing 20. For this, first, the fining 47 of the guide rail member 41 is inserted into the recess 27 formed at the lateral surface of the housing 20, and simultaneously, the rearward extending fixture 22 formed at the rear surface of the housing 20 is penetrated through the hole 45 of the fixing plate 46. Then, the sliding unit 40 is fixed to the housing 20 by bolting the fixture 22.

In succession, the part of the connecting member 60 formed with the pin hole 61 is coupled to the door 30 by inserting the pin through the pin hole 61, and the bore 62 of the connecting member 60 is fitted around the connector protrusion 63 of the holder portion 59.

In this way, in a state wherein the sliding unit 40 is mounted to the lateral outer surface of the housing 20, the tray of the present invention is fitted in an appropriately selected position inside a passenger compartment of an automotive vehicle. Now, the opening or closing operation of the tray will be explained.

After a locker for the door 30 is released in a closed state of the tray as shown in FIG. 4, the door 30 is pivotally rotated downward about the hinge 31, reaching an opened state of the tray as shown in FIG. 3.

In this case, according to such a downward pivotal rotation of the door 30, the sliding unit 40, connected with the door 30 by means of the connecting member 60, is moved forward.

That is, as the door 30 is pivotally rotated downward, the connecting member 60 is moved forward, causing the damper member 51 to be moved forward along the guide rail member 41 by means of the connector protrusion 63 coupled to the connecting member 60. In this case, since the damper member 51 is moved in a state wherein the toothed row 42 of the guide rail member 41 is engaged with the circular gear 52 of the damper member 51, the damper member 51 can function to control an opening operating speed of the door 30.

Here, even in case of closing the door 30 the same mechanism as stated above is applied.

Meanwhile, the sliding unit 40 is configured in such a fashion that it can move a desired object without requiring a toothed structure formed at the housing 20. This enables the sliding unit 40 to be applied to a tray having a case received in a housing to protrude out of the housing, in addition to being used to rotate the door.

That is, explaining such a tray having the case, the door 30 is coupled to the case received in the housing 20. As the locker of the door 30 is unlocked, the door 30 is adapted to protrude forward by means of elastic means (not shown), such as springs. Even in this case, the door 30 is connected with the sliding unit 40 by means of the connecting member 60, thus, the sliding manner thereof is the same as the above description.

As apparent from the above description, the present invention provides an opening/closing structure for a vehicular tray which can eliminate the need for certain toothed structures to be formed at a housing of the tray, thereby simplifying the shape of a mold, and securing easy manufacture thereof.

Further, according to the present invention, as a result of modular sliding units being mounted at both lateral outer surfaces of the housing, and a door being connected with the sliding units by means of connecting members, the door can be opened or closed in a sliding manner. Such a sliding unit is applicable to various shapes of trays.

Furthermore, according to the present invention, since the sliding units are positioned outside of the housing, they can be easily seen, resulting in ease in their tuning operation as well as repair thereof in case of damage or failure of parts.

Although a preferred embodiment of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An opening/closing structure for a vehicular tray comprising:
   a housing opened at a front surface, and internally defining a receiving space, the housing being mounted at a predetermined position of a vehicle body, and having a pair of through-holes, one through-hole of said pair of through holes formed on one protrusion extending from one side of the front surface of the housing, and another through-hole of said pair of through-holes formed on another protrusion extending from another side of the front surface of the housing;
   a door covering the front surface of the housing;
   a pair of sliding units, each sliding unit of said pair of sliding units respectively mounted on an opposed outer surface of the housing, each of the sliding units being horizontally movable through gear engagement; and
   a pair of connecting members, a first end of each of the connecting members being coupled to the door, a second end of the connecting member passing through one of the through-holes and being fixed to an associated one of the sliding unit.

2. The structure as set forth in claim 1, wherein the door is hinged to one edge of the front surface of the housing.

3. The structure as set forth in claim 1, wherein each of the sliding units comprises:
   a guide rail member fixed to one of the opposed outer surfaces of the housing, and provided with a horizontal toothed row having a prescribed length; and
   a damper member having a circular gear configured to be engaged in the toothed row provided at the guide rail member so as to be horizontally moved along the toothed row.

4. The structure as set forth in claim 3, wherein:
   the guide rail member comprises:
      a body formed with the toothed row horizontally disposed near a lower end of the opposed outer surface; and
      a horizontal guide slot perforated above the toothed row; and
   the damper member comprises:
      a damper portion having the circular gear rotatably coupled thereto, and one or more damper holes; and
      a holder portion having one or more holder holes, which are formed at one side thereof to correspond to the damper holes for the coupling of the damper portion and the holder portion, a threaded fastening protrusion, which is formed at the other side thereof so as to be inserted and fastened in the guide slot, and a central opening that allows the circular gear of the damper portion to be engaged therein.

5. The structure as set forth in claim 3, wherein the body of the guide rail member is further formed at one side thereof with an outwardly-extending fitting, and at a corresponding outer position of the housing is defined a recess for use in the insertion of the fitting.

6. The structure as set forth in claim 4, wherein the body of the guide rail member is further formed at one side thereof with an outwardly-extending fitting, and at a corresponding outer position of the housing is defined a recess for use in the insertion of the fitting.

7. The structure as set forth in claim 3, wherein the housing further has a pair of rearward extending fixtures formed at a rear surface thereof, and
   wherein the body of the guide rail member is further formed at the other side thereof with a fixing plate, the fixing plate being curved to come into close contact with the rear surface of the housing, and having a hole for use in the insertion of the fixture.

8. The structure as set forth in claim 4, wherein the housing further has a pair of rearward extending fixtures formed at a rear surface thereof, and
   wherein the body of the guide rail member is further formed at the other side thereof with a fixing plate, the fixing plate being curved to come into close contact with the rear surface of the housing, and having a hole for use in the insertion of the fixture.

9. The structure as set forth in claim 4, wherein the first end of the connecting member is formed with a pin hole for the pin coupling of the door, and the second end of the connecting member is formed with a bore that receives a connector protrusion formed at the holder portion.

10. The structure as set forth in claim 4, wherein the first end of the connecting member is formed with a pin hole for the pin coupling of the door, and the second end of the connecting member is formed with a bore that receives a connector protrusion formed at the holder portion.

* * * * *